MAGNETIC CORE REGISTERS

Filed May 24, 1961

Inventor

HAROLD N. COATES

By Imirie & Smiley

Attorneys

United States Patent Office 3,097,350

Patented July 9, 1963

3,097,350
MAGNETIC CORE REGISTERS

Harold Noel Coates, East Grinstead, England, assignor to International Computers and Tabulators Limited, London, England, a company of Great Britain Filed May 24, 1961, Ser. No. 112,433
Claims priority, application Great Britain June 23, 1960
4 Claims. (Cl. 340—174)

Figure 1:
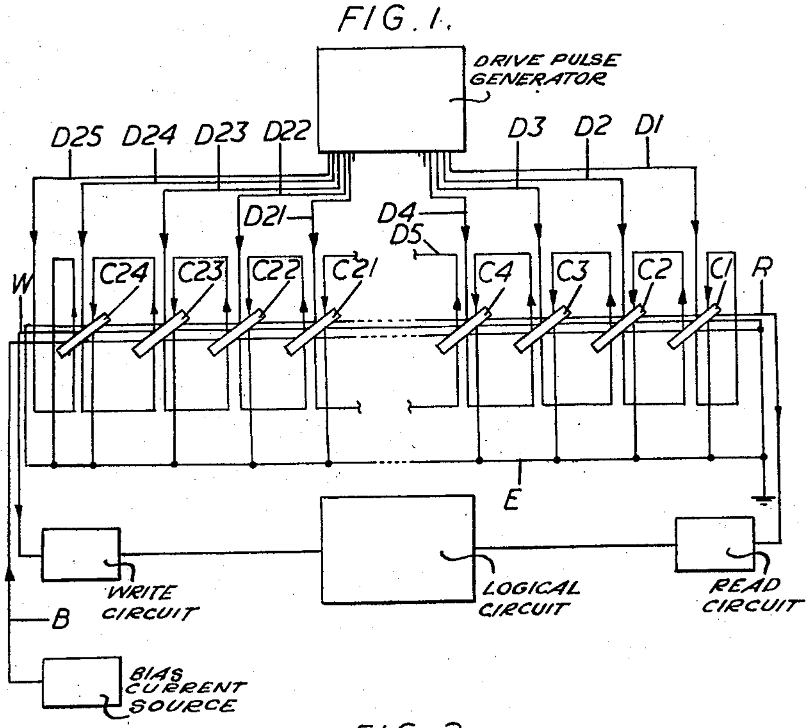

This invention relates to magnetic core registers and in particular to magnetic core registers of the kind comprising a plurality of magnetic storage cores having square-loop hysteresis characteristics each for storing a binary digit and arranged in a series so that a stored number can be read out serially from the register as a series of pulses on a single line.

Read-out from registers of this kind is destructive as the cores are reset by the read-out operation. Therefore when a stored number is read-out to computing circuits it must be recirculated back into the register if it is to be preserved. Further, registers of this kind are often used in conjunction with logical circuits which operate on a serial number read out from the register, and which transmit a number back to the register while the original number is being read out.

In prior registers of this kind it has been necessary to provide separate read and write driving circuits which pulse the cores individually in one direction for reading and in the opposite direction for writing, and when all the cores of the register are linked by a common read-out winding and a common write winding it has not been possible to read and write during the same time interval because of interference between pulses induced on the common windings by read-out from and writing into the cores.

It has therefore been customary to operate a recirculating magnetic core register by reading out from the lowest core, processing the data read, and then writing back into the first core before the next core is read. In order to work at very fast speeds, for example a read/write cycle for each core of 1 to 3 microseconds, it has been necessary to provide very fast switching of the cores as well as very fast logical circuits for processing the data. High speed transistor circuits have been used for this purpose, and separate read and write drive windings, connected to separate read and write drive pulse generators, have been necessary on each core because it is impossible to switch the drive current in a single winding from one direction to the opposite direction in the short time available.

It is a main object of the invention to provide simple and inexpensive circuits in that only a single drive pulse generator is necessary and less expensive logical circuits can be employed for processing data read from the register without sacrificing any of the high speed advantages of the prior apparatus.

According to the present invention there is provided a magnetic core register comprising a plurality of magnetic storage cores each for storing a binary digit and arranged in a series, a plurality of drive windings one for each core, each drive winding being threaded twice in the same sense through its core to produce a field in one direction and, except for the drive winding of the lowest core of the series, being threaded in the opposite sense through the next lower core to produce a field in the opposite direction, an additional drive winding threaded through the highest core to produce a field in said opposite direction, a bias winding threading all the cores and connected to a source of bias current to produce a field in said one direction in each core, a write winding threading all the cores and connected to write circuits arranged to produce a field in said opposite direction in each core, a read-out winding threading all the cores, and a drive pulse generator connected to the drive windings and operable to energise them in sequence, whereby on energisation of a drive winding, other than the lowest and the highest, the change of field is greater in the higher one of the pair of cores threaded by that drive winding so that a switching field is built up in said higher core in said one direction to read a digit from that core and, if the write winding is energised, a switching field is built up in the lower core of the pair in said other direction to write a digit into the core.

Thus data can be read from and written into the register during the same time period which is determined by the application of a single drive pulse to the register.

Further according to the invention the lowest drive winding is arranged to be energised first in the sequence to read a digit from the first core, and the additional drive winding is arranged to be energised last in the sequence to write a digit, as appropriate into the highest core.

The invention also comprehends a magnetic core register according to the invention in combination with a logical circuit whose input is connected to the read-out windings through a read circuit and whose output is connected to the write winding through a write circuit, the delay in the logical circuit being equal to the period between drive pulses so that the digit read from each core or a digit derived therefrom is written back into that core.

Figure 2:
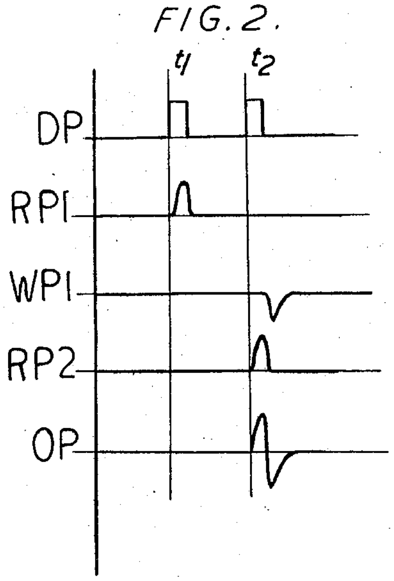

In order that the invention may be clearly understood an embodiment thereof will now be described, by way of example, with reference to the accompanying diagrammatic drawings in which:

FIGURE 1 is a schematic diagram of a magnetic core register according to the invention, and FIGURE 2 is a timing diagram showing the operation of the register.

Referring to FIGURE 1 of the drawings a magnetic core register comprises a plurality of magnetic storage cores C1 to C24 arranged in a series. The register illustrated by way of example is for the storage of a six digit decimal number, each decimal digit being coded in a 1, 2 ,4, 8 binary code, that is the lowest four cores C1, C2, C3 and C4 store the decimal digit of lowest denomination and the highest four cores C21, C22, C23 and C24, as shown in FIGURE 1, store the decimal digit of highest denomination.

A plurality of drive windings D1 to D24 are provided one for each of the cores, each drive winding being threaded twice in the same sense through its core to produce a field in one direction in that core. Except for the drive winding D1 of core C1 which is the lowest core of the series, each drive winding is also threaded in the opposite sense through the next lower core to produce a field in the opposite direction in that core. The drive winding is then looped back and threaded again through its core to provide the double winding and is then connected to earth.

Thus for example the drive winding D2 of core C2 is threaded through core C2, is looped back through core C1, and is threaded back through core C2 again in the same sense and is then connected to an earth line E. The drive winding D1 of core C1 is looped round through core C1 twice and then connected to earth E, and the highest core C24 is threaded by an additional drive winding D25 which is threaded through it in the sense to produce a field in the opposite direction through core C24 to the field produced in it by its drive winding D24.

A bias winding B is threaded through all the cores and one end of the bias winding is connected to a bias current source. The other end of the bias winding B is connected to the earth line E and the current from the bias current source flows through the bias winding in the direction indicated by the arrow so that the field produced in each core by the bias winding is in the same direction as that produced by the drive winding associated with that core.

The cores are also threaded by a write winding W which is connected between the earth line E and a write circuit. A read-out winding R also threads all the cores between earth E and a read circuit. The write circuit and write winding W are arranged so that when a digit is to be written into one of the cores a field is produced in that core in the opposite direction to the field produced by the bias winding B.

The drive windings D1 to D25 are all connected to a drive pulse generator which is operable to energise the drive windings in sequence beginning with the lowest winding D1 and ending with the highest winding D25. In the particular embodiment illustrated the register is employed as a recirculating register, the number read from the register being operated on in a logical circuit whose input is connected to the read-out winding R through the read circuit, and whose output is connected to the write circuit.

On energisation of the lowest drive winding D1 by a drive pulse DP at time $t_1$, as illustrated in FIGURE 2, a switching field is built up in core C1 by the drive pulse current and the bias current and if a digit is stored in core C1 it is read out on to the read-out winding R as indicated by the pulse RP1 shown in FIGURE 2. This pulse RP1 is transmitted to the logical circuit where it is processed, the delay in the logical circuit being equal to the time between drive pulses so that the digit read from core C1, or a digit derived therefrom is not transmitted by the write circuit on to the write winding W until time $t_2$, as indicated by the pulse WP1 in FIGURE 2.

At time $t_2$ a drive pulse is transmitted on drive winding D2 to core C2 and the resultant current which induces field in core C2 if a digit is being written in core C1 is twice the drive pulse current plus the bias current minus the write pulse current. The resultant field inducing current in core C1 in the opposite direction at time $t_2$ is the drive pulse current plus the write current minus the bias current. For example if the drive pulse current is 550 ma., the bias current is 150 ma. and the write current is 350 ma. then the switching current linking core C2 is $550\times2+150-350=900$ ma. While the current linking core C1 in the opposite direction is $$550+350-150=750 \text{ ma.}$$

The field induced by this current in core C2 is sufficient to switch that core if a digit is stored in it and to produce a read-out pulse RP2 on line R as shown in FIGURE 2. The field in the opposite direction in core C1 is sufficient to switch that core to write a digit back into it, but because the switching field built up in the higher core C2 of the pair of linked cores C1 and C2, is greater than the switching field in the lower core C1, the core C2 will switch faster than the core C1 and the read pulse RP2 will have died down on line R before the core C1 switches when the digit is written into it, as indicated by pulse WP1, so that there is no interference on the lines W and R between the reading from core C2 and the writing into core C1.

The resultant output on the line R is shown in FIGURE 2 as pulse OP. The negative-going part of this pulse OP corresponds to the writing into core C1, and does not interfere with the positive-going part which corresponds to the reading-out from core C2.

If no digit is to be written into core C1 at time $t_2$ then there is no output from the write circuit. At time $t_2$ the current threading core C2 is $550\times2+150=1250$ ma., and the current threading core C1 is $550-150=400$ ma. That is a switching field is built up in core C2 to read-out a stored digit from it, but the field in core C1 is insufficient to switch it so that it remains in its zero state.

Similarly as each of the drive windings D3 to D24 is energised in sequence a stored binary digit, if any, is read from the core for that drive winding and a binary digit is written as appropriate into the next lower core which is also linked by that drive winding. After drive winding D24 has been energised the highest drive winding D25 is energized so that a binary digit, if any, is written into core C24.

Thus it will be apparent that the whole of the time between the reading-out from a core and the writing back into the same core can be occupied by processing of the digit in the logical circuit, and it is not necessary to use very high speed circuits in the logical circuits in order to operate at a pulse repetitive frequency for the drive pulse of, for example 10 microseconds. It will be apparent that much shorter periods can be used if the logical operations are simplified and in fact for straight recirculating the pulse repetitive frequency can be reduced to about 2 microseconds, for example, before the write pulse begins to interfere with the following read pulse. Further only a single drive pulse generator is necessary for both reading and writing.

I claim:

1. A magnetic core register comprising a plurality of magnetic storage cores each for storing a binary digit and arranged in a series, a plurality of drive windings, one for each core, each drive winding being threaded twice in the same sense through its core to produce a field in one direction and except for the drive winding of the lowest core of the series, being threaded in the opposite sense through the next lower core to produce a field in the opposite direction, an additional drive winding threaded through the highest core to produce a field in said opposite direction, a bias winding threading all the cores, a source of bias current connected to said bias winding and operable to produce therein a field in said one direction in each core, a write winding threading all the cores, write circuits connected to said write winding and operable to produce therein a field in said opposite direction in each core, a read-out winding threading all the cores, and a drive pulse generator connected to the drive windings and operable to energise them in sequence whereby on energisation of a drive winding, other than the lowest and the highest, the change of field is greater in the higher one of the pair of cores threaded by that drive winding so that a switching field is built up in said higher core in said one direction to read a digit from that core and, if the write winding is energised, a switching field is built up in the lower core of the pair in said opposite direction to write a digit into the lower core.

2. A register according to claim 1, in combination with a logical circuit, a read circuit connecting the input of the logical circuit to the read-out winding, a write circuit connecting the output of the logical circuit to the write winding, the delay in the logical circuit being equal to the period between drive pulses so that the digit read from each core or a digit derived therefrom is written back into that core.

3. A register according to claim 1, wherein the lowest drive winding is arranged to be energised first in the sequence to read a digit from the first core, and the highest drive winding is arranged to be energised last in the sequence to write a digit as appropriate into the highest core.

4. A register according to claim 3, in combination with a logical circuit, a read circuit connecting the input of the logical circuit to the read-out winding, and a write circuit connecting the output of the logical circuit to the write winding, the delay in the logical circuit being equal to the period between drive pulses so that the digit read from each core or a digit derived therefrom is written back into that core.

No references cited.